United States Patent
Rogers et al.

(10) Patent No.: US 9,316,072 B2
(45) Date of Patent: Apr. 19, 2016

(54) VALVE FOR COMMUNICATION OF A MEASUREMENT WHILE DRILLING SYSTEM

(71) Applicant: Gyrodata, Incorporated, Houston, TX (US)

(72) Inventors: John Preston Rogers, Houston, TX (US); Stephen D. Bonner, Sugar Land, TX (US); Robert Rudolph Kirby, Plantersville, TX (US); Eugene Linyaev, Houston, TX (US)

(73) Assignee: Gyrodata, Incorporated, Houston, TX (US)

( * ) Notice: Subject to any disclaimer, the term of this patent is extended or adjusted under 35 U.S.C. 154(b) by 458 days.

(21) Appl. No.: 13/791,656

(22) Filed: Mar. 8, 2013

(65) Prior Publication Data

US 2013/0277119 A1    Oct. 24, 2013

Related U.S. Application Data

(60) Provisional application No. 61/621,335, filed on Apr. 6, 2012.

(51) Int. Cl.
 *E21B 47/18*   (2012.01)
 *E21B 21/10*   (2006.01)
 *F16F 9/20*    (2006.01)
 *F16K 3/08*    (2006.01)

(52) U.S. Cl.
 CPC ............... *E21B 21/10* (2013.01); *E21B 47/18* (2013.01); *E21B 47/182* (2013.01); *F16F 9/20* (2013.01); *F16K 3/085* (2013.01); *Y10T 29/49412* (2015.01)

(58) Field of Classification Search
 CPC .............................. E21B 47/18; E21B 47/187
 See application file for complete search history.

(56) References Cited

U.S. PATENT DOCUMENTS

| | | | |
|---|---|---|---|
| 4,914,637 A | 4/1990 | Goodsman | |
| 5,237,540 A | 8/1993 | Malone | |
| 5,249,161 A | 9/1993 | Jones et al. | |
| 5,375,098 A | 12/1994 | Malone et al. | |
| 5,586,083 A | 12/1996 | Chin et al. | |
| 6,105,690 A | 8/2000 | Biglin, Jr. et al. | |
| 6,219,301 B1 | 4/2001 | Moriarty | |
| 6,714,138 B1 | 3/2004 | Turner et al. | |
| 6,970,398 B2 | 11/2005 | Lavrut et al. | |
| 6,975,244 B2 | 12/2005 | Hahn et al. | |
| 7,808,859 B2 | 10/2010 | Hahn et al. | |
| 8,181,719 B2 * | 5/2012 | Bunney et al. | 175/56 |
| 2015/0023137 A1 * | 1/2015 | Benson | 367/82 |

* cited by examiner

*Primary Examiner* — William P Neuder
(74) *Attorney, Agent, or Firm* — Pramudji Law Group PLLC; Ari Pramudji

(57) ABSTRACT

A valve for communication of a measurement while drilling system includes a first structure having a central portion and one or more elongate portions radially extending from the central portion, and a second structure having one or more portions which substantially bound a central orifice region and one or more elongate orifice regions radially extending from the central orifice region. At least one of the first structure and the second structure is configured to be rotated about a rotation axis to produce a relative rotation between the first structure and the second structure such that a flow path through which mud can flow varies as the at least one of the first structure and the second structure rotates about the rotation axis. The central portion has a maximum inscribed circle encircling the rotation axis and having a first radius and the central orifice region has a maximum inscribed circle encircling the rotation axis and having a second radius greater than the first radius.

29 Claims, 8 Drawing Sheets

VALVE FOR COMMUNICATION OF A MEASUREMENT WHILE DRILLING SYSTEM

CROSS-REFERENCE TO RELATED APPLICATIONS

This application claims the benefit of priority to U.S. Provisional Appl. No. 61/621,335 filed on Apr. 6, 2012 and incorporated in its entirety by reference herein.

BACKGROUND

1. Field of the Application

This application is generally directed to wellbore drilling systems and methods, and particularly to valves used in communication of a measurement while drilling system.

2. Description of the Related Art

Valves are used in the field of communication of a measurement while drilling system. In a rotary valve (which can also be referred to in various contexts as a circular valve, rotational valve, reciprocating valve, or oscillatory valve), when the rotor blades align with the stator orifices, the valve is in a maximally closed position, and presents what is referred to as "the minimum flow area" to that portion of the mud stream that passes through the valve, and that results in the largest pressure drop across the valve. In Goodsman (U.S. Pat. No. 4,914,637), Moriarty (U.S. Pat. No. 6,219,301), and Turner (U.S. Pat. No. 6,714,138), this minimum flow area is near the outer diameter (OD) of the rotor blades (when the rotor OD is less than the stator orifice maximum diameter) or is provided by some other pathway, as further disclosed by Moriarty, such as a hole in the rotor blade itself or clearance notches in the stator body. In Malone (U.S. Pat. Nos. 5,375,098 and 5,237,540), the minimum flow area is provided by a large mechanical clearance (gap setting) between the rotor and stator faces. Other examples of valve technology are disclosed by: U.S. Pat. No. 5,249,161 to Jones et al.; U.S. Pat. No. 5,586,083 to Chin et al.; U.S. Pat. No. 6,105,690 to Biglin, Jr. et al.; U.S. Pat. No. 6,970,398 to Lavrut et al.; U.S. Pat. No. 6,975,244 to Hahn et al.; and U.S. Pat. No. 7,808,859 to Hahn et al.

SUMMARY

In certain embodiments, a valve for communication of a measurement while drilling system is provided. The valve comprises a first structure having a central portion and one or more elongate portions radially extending from the central portion. The valve further comprises a second structure having one or more portions which substantially bound a central orifice region and one or more elongate orifice regions radially extending from the central orifice region. At least one of the first structure and the second structure is configured to be rotated about a rotation axis to produce a relative rotation between the first structure and the second structure such that a flow path through which mud can flow varies as the at least one of the first structure and the second structure rotates about the rotation axis. The flow path is defined at least by the first structure and the second structure. The central portion has a maximum inscribed circle encircling the rotation axis and having a first radius and the central orifice region has a maximum inscribed circle encircling the rotation axis and having a second radius greater than the first radius.

In certain embodiments, a valve for communication of a measurement while drilling system is provided. The valve comprises a first structure having a central portion and a second structure having one or more portions which substantially bound a single unitary orifice region. At least one of the first structure and the second structure is configured to be rotated about a rotation axis to produce a relative rotation between the first structure and the second structure such that a flow path through which mud can flow is bounded at least in part by the first portion and the second structure. The flow path varies between a first configuration when the first and second structures are in a maximally closed position and a second configuration when the first and second structures are in a maximally open position. Mud flowing through the flow path in the first configuration experiences a first pressure difference and mud flowing through the flow path in the second configuration experiences a second pressure difference which is less than the first pressure difference.

In certain embodiments, a valve for communication of a measurement while drilling system is provided. The valve comprises a first structure comprising a hub and a plurality of blades radially extending from the hub. The valve further comprises a second structure comprising an outer ring and a plurality of portions radially extending from the outer ring towards a center region of the second structure. At least one of the first structure and the second structure is configured to be controllably rotated about a rotation axis to produce a relative rotation between the first structure and the second structure such that the first structure and the second structure define a flow path through which mud can flow. The flow path has a flow area projected in a plane substantially perpendicular to the rotation axis and varying between a minimum flow area when the first and second structures are in a maximally closed position and a maximum flow area when the first and second structures are in a maximally open position. The maximum flow area radially extends a maximum first distance between the hub and the outer ring and the minimum flow area radially extends a maximum second distance between the hub and the plurality of portions, wherein the maximum second distance is between 10% and 90% of the maximum first distance.

In certain embodiments, a method of fabricating a valve for communication of a measurement while drilling system is provided. The method comprises providing a first structure having a central portion and one or more elongate portions extending from the central portion. The method further comprises providing a second structure having one or more elongate portions which substantially bound a central orifice region and one or more elongate orifice regions extending from the central orifice region. At least one of the first structure and the second structure is configured to be rotated about a rotation axis to produce a relative rotation between the first structure and the second structure such that a flow path through which mud can flow varies between a first configuration when the valve is in a maximally closed position and a second configuration when the valve is in a maximally open position. The flow path is defined at least by the first structure and the second structure. The valve has a maximum differential pressure across the valve when in the maximally closed position and has a minimum differential pressure across the valve when in the maximally open position. The method further comprises selecting a first angular width of the one or more elongate portions about the rotation axis and a second angular width of the one or more elongate orifice regions about the rotation axis. The method further comprises, after selecting the first and second angular widths, selecting a first radial extent of the central portion of the first structure and a second radial extent of the one or more elongate portions of the second structure.

DETAILED DESCRIPTION

Figure 1:
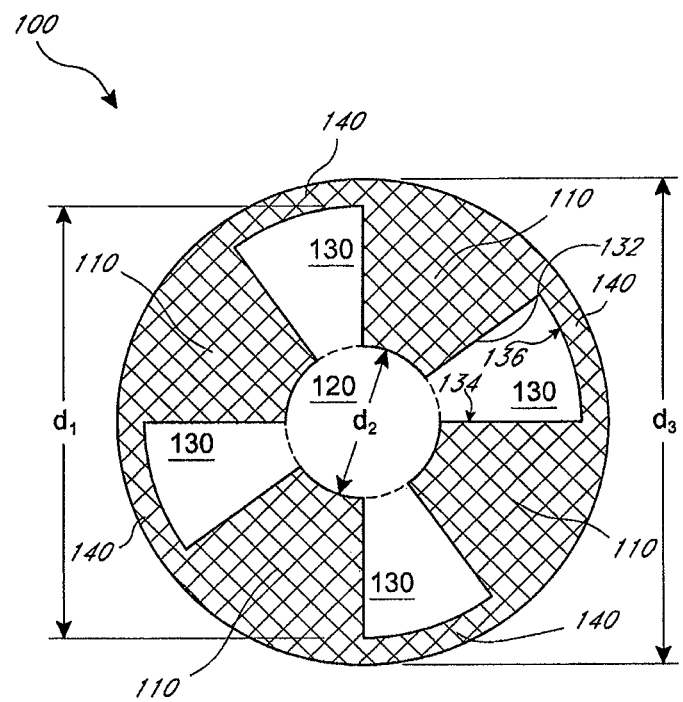
FIG. 1 schematically illustrates a cross-sectional plane of a stator assembly compatible with certain embodiments described herein.

FIG. 1 schematically illustrates a cross-sectional plane of a stator assembly 100 compatible with certain embodiments described herein. In certain embodiments, the stator assembly 100 comprises a structure having one or more portions 110 which substantially bound a central orifice region 120 and one or more elongate orifice regions 130 radially extending from the central orifice region 120. The central orifice region 120 encompasses the rotation axis of the valve and has a maximum inscribed circle encircling the rotation axis. The maximum inscribed circle of the central orifice region 120 is inscribed within the central orifice region 120 without overlapping the one or more portions 110 and has the largest radius of all circles inscribed within the central orifice region 120 without overlapping the one or more portions 110.

For example, the stator assembly 100 of FIG. 1 comprises one large connected or unitary orifice with several elongate portions (e.g., fingers) 110 extending or pointing from the outer diameter of the stator assembly (e.g., the stator ring 140) towards the center of the stator assembly (e.g., a region in which the rotor hub and axle reside). In certain embodiments, the elongate portions 110 extend inwardly from the stator ring 140 (e.g., the outer diameter of the stator assembly) to a position at some distance from the geometrical center of the stator assembly 100. For example, as schematically illustrated by FIG. 1, the elongate portions 110 extend inwardly from the stator ring 140 to a common radius of a circle (shown as a dashed line) concentric with the center of the stator assembly 100. This dashed line represents the maximum inscribed circle of the central orifice region shown in FIG. 1. In certain embodiments, the elongate portions are formed continuous with other portions of the stator assembly (e.g., with the stator ring 140), while in certain other embodiments, the elongate portions 110 and the other portions of the stator assembly 100 comprise a plurality of pieces that are assembled together to form the stator assembly 100. In the description below, the following dimensions will be used to describe aspects of the stator assembly 100: the maximum diameter of the stator orifices ($d_1$), the inner diameter defining the inward extent (e.g., length) of the stator elongate portions ($d_2$), and the stator assembly OD ($d_3$).

Figure 2:
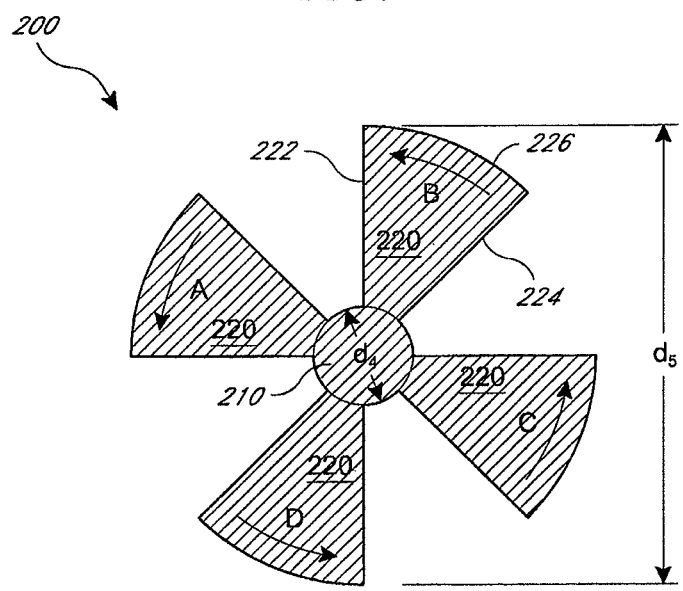
FIG. 2 schematically illustrates a cross-sectional plane of a rotor assembly compatible with certain embodiments described herein.

FIG. 2 schematically illustrates a cross-sectional plane of a rotor assembly 200 compatible with certain embodiments described herein. In certain embodiments, the rotor assembly 200 comprises a structure having a central portion 210 and one or more elongate portions 220 radially extending from the central portion 210. The central portion 210 has a maximum inscribed circle encircling the rotation axis of the valve. The maximum inscribed circle of the central portion 210 is inscribed within the central portion 210 without extending past the central portion 210 and has the largest radius of all circles inscribed within the central portion 210 without extending past the central portion 210.

For example, the rotor assembly 200 shown in FIG. 2 comprises a central portion 210 (e.g., hub) and a plurality of elongate portions 220 (e.g., blades) extending outward from the central portion 210. The circle drawn on the central portion 210 represents the maximum inscribed circle of the central portion 210 shown in FIG. 2. In certain embodiments, the number of elongate portions 220 (e.g., blades) of the rotor assembly 200 is equal to the number of elongate portions 110 (e.g., fingers) of the stator assembly 100, and the blades 220 are substantially identical to one another and are substantially uniformly distributed about the rotation axis.

In certain embodiments, one or more elongate portions 220 (e.g., blades) each have a first edge 222 and a second edge 224 both extending substantially radially from the central portion 210 (e.g, hub) and having a first angle between the first edge 222 and the second edge 224. In certain such embodiments, the one or more elongate orifice regions 130 of the stator assembly 100 each have a third edge 132 and a fourth edge 134 both extending substantially radially from the central orifice region 120 and having a second angle between the third edge 132 and the fourth edge 134, with the second angle less than the first angle. The outer edge 226 of one or more elongate portions (e.g., blades) is at a first maximum radial distance from the rotation axis, and the one or more elongate orifice regions 130 have an outer edge 136 at a second maximum radial distance from the rotation axis that is smaller than the first maximum radial distance. For example, the OD of the elongate portions 220 (e.g., rotor blades) in certain embodiments is chosen to be larger than the largest diameter of the stator orifice. The one or more elongate portions 220 (e.g., blades) of certain such embodiments block mud from flowing through a maximum portion of the one or more elongate orifice regions 130 when the rotor assembly 200 and the stator assembly 100 are in the maximally closed position.

When assembled, the upstream face of the rotor assembly 200 can be closely positioned to the downstream face of the stator assembly 100, with enough mechanical clearance to allow for low friction rotation of the rotor assembly 200. In certain embodiments, the elongate portions (e.g., blades) are formed continuous with other portions of the rotor assembly 200 (e.g., with the central portion 210, with the rotor hub), while in certain other embodiments, the elongate portions 220 and the other portions of the rotor assembly 200 comprise a plurality of pieces that are assembled together to form the rotor assembly 200. In the description below, the following dimensions will be used to describe aspects of the rotor assembly 200: the diameter of the central portion 210 (e.g., rotor central hub) ($d_4$) and the OD of the elongate portions 220 (e.g., rotor blades) ($d_5$) (e.g., defining the outward extent of the rotor blades).

In certain embodiments, the diametral relationships between the dimensions of the stator assembly 100 and the rotor assembly 200 are as follows:

$d_3 \geq d_5 \geq d_1$, and $d_4 \leq d_2$.

In certain embodiments in which the valve is in its fully closed position, the minimum flow area is determined by $(d_2-d_4)$ and the arc length between the rotor blades at the diameter of $((d_2+d_4)/2)$. In certain embodiments, the maximum flow area radially extends a maximum first distance between the central portion 210 (e.g., hub) and the outer ring (e.g., a distance $x_1=(d_1-d_4)/2$) and the minimum flow area radially extends a maximum second distance between the central portion 210 (e.g., hub) and the plurality of elongate portions (e.g., a distance $x_2=(d_2-d_4)/2$). The blade length in certain embodiments is larger than the distance $x_2$. In certain embodiments, the maximum second distance $x_2$ is between 10% and 90% of the maximum first distance $x_1$. In certain such embodiments, $x_2$ is no greater than 75%, 50%, or 25% of $x_1$. In contrast, conventional systems have $d_3 \geq d_1 \geq d_5$, leaving a dimension of the minimum flow area equal to $(d_1-d_5)$ distributed towards the outer region of the valve.

In certain embodiments, the angular widths of the elongate portions 220 (e.g., rotor blades) and the elongate portions 110 (e.g., stator fingers) are chosen to enable a stable open position as well as to allow for a pressure waveform with roughly equivalent time durations and pressure differences for the high pressure and low pressure values relative to the mean pressure datum of the waveform. The angular widths of the elongate portions 110 (e.g., stator fingers) are related to the angular widths of the elongate orifice regions 130 of the stator assembly 100. For example, for a stator assembly 100 having four-fold symmetry, the sum of the angular width of an elongate portion 110 and the angular width of an adjacent elongate orifice region 130 sum to equal 90 degrees. Similarly, the angular widths of the elongate portions 220 (e.g., rotor blades) are related to the angular width of the regions between the elongate portions 220. For example, for a rotor assembly 200 having four-fold symmetry, the sum of the angular width of an elongate portion 220 and the angular width of an adjacent region sum to equal 90 degrees.

In certain embodiments, a first angular width of the one or more elongate portions 220 about the rotation axis and a second angular width of the one or more elongate orifice regions 130 about the rotation axis are selected, and after selecting the first and second angular widths, a first radial extent of the central portion 210 of the rotor assembly 200 and a second radial extent of the one or more elongate portions 110 of the stator assembly 100 are selected. In certain embodiments, the first angular width and the second angular width are selected such that a pressure waveform generated by the valve is a balanced waveform, and the first radial extent and the second radial extent are selected independently from selecting the first and second angular widths to adjust a magnitude of the pressure waveform. In certain embodiments, the differential pressure across the valve over a time period approximately equal to an integral number of cycles has a balanced waveform. In certain such embodiments, a time average of a differential pressure across the valve over an integral number of cycles in approximately equal to an arithmetic average of the maximum differential pressure and the minimum differential pressure.

In certain embodiments described herein, the valve is configured so as to decouple the apparatus dimensions that independently determine the pressure amplitude and the dwell (or duty cycle) adjustment when the valve is operated in the fully rotational mode. For example, once the relative angular widths of the stator elongate portions 110 (e.g., fingers) and the elongate portions 220 (e.g., rotor blades) are selected to generate the desired dwell of the pressure wave, then the amplitude of the pressure wave can be adjusted by changing diameters $d_2$ of the stator assembly 100 and $d_4$ of the rotor central portion 210 (e.g., hub).

For the oscillatory mode, in certain embodiments, the amplitude and dwell are further controlled by means of the amount of maximum closure and the amount of time the rotor assembly 200 spends in the maximum closed position. In certain embodiments, upon a substantially constant angular velocity of the relative rotation between the rotor assembly 200 and the stator assembly 100, a time average of a differential pressure across the valve over an integral number of cycles is approximately equal to an arithmetic average of (i) the differential pressure across the valve in the maximally open position and (ii) the differential pressure across the valve in a maximally closed position. In certain such embodiments, the differential pressure as a function of time approximates a square wave function.

In certain embodiments, the valve is configured to be mounted within a tool body, and the rotor assembly 200 is configured to be controllably rotated relative to the tool body about the rotation axis, and the stator assembly 100 is configured to not rotate relative to the tool body. In certain embodiments, the rotor assembly 200 and the stator assembly 100 define a flow path through which mud can flow. At least one structure (e.g., the rotor assembly 200) of the valve is configured to be rotated about a rotation axis to produce a relative rotation between the at least one structure and another structure (e.g., the stator assembly 100) of the valve. By virtue of this rotation, the flow path through which mud can flow varies as the at least one structure (e.g., the rotor assembly 200) rotates about the rotation axis.

Figure 3A:
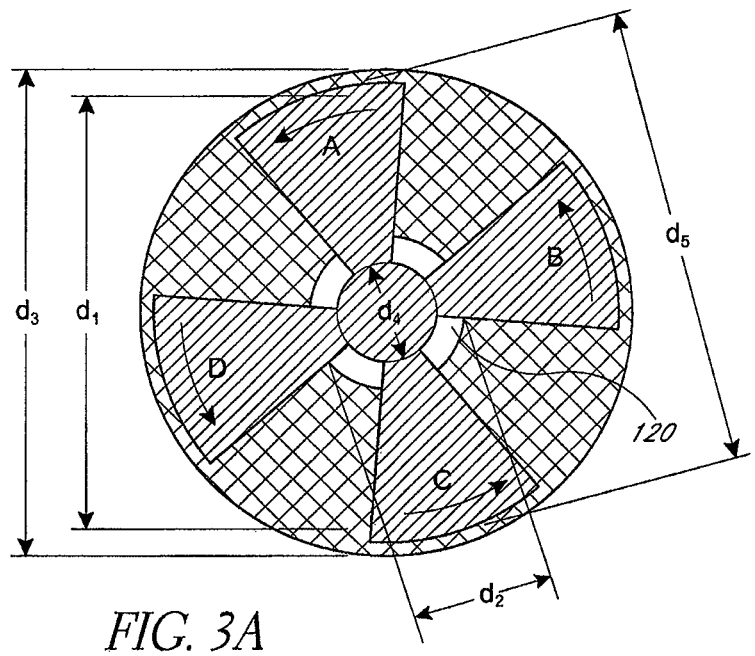
FIGS. 3A-3D schematically illustrate four positions of the rotor assembly when used in the continuously rotating mode in accordance with certain embodiments described herein.
Figure 5A:
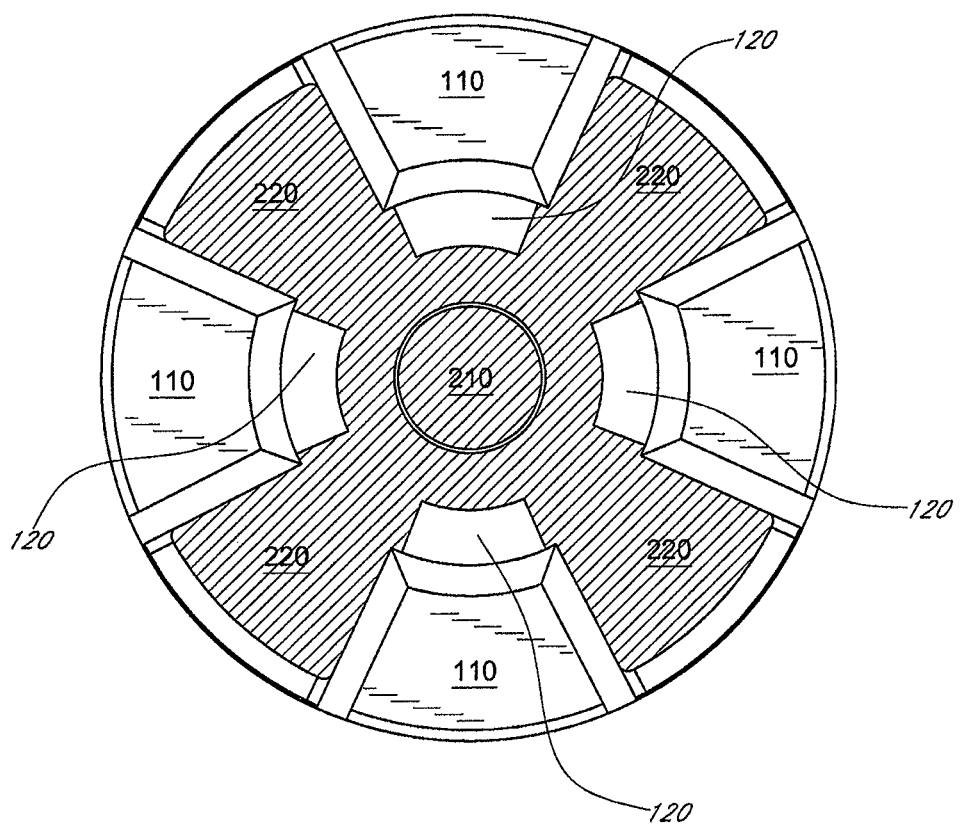
FIGS. 5A and 5B schematically illustrate an on-axis view and an off-axis view, respectively, of an example stator assembly and rotor assembly in the maximally closed position in accordance with certain embodiments described herein.

In certain embodiments, the central portion 210 and the central orifice region 120 are concentric with one another (e.g., both substantially centered about the rotation axis). In certain embodiments, the radius of the maximum inscribed circle of the central orifice region 120 is greater than the radius of the maximum inscribed circle of the central solid portion 210. The flow path of certain embodiments varies between a first configuration when the rotor assembly 200 and the stator assembly 100 are in a maximally closed position and a second configuration when the rotor assembly 200 and the stator assembly 100 are in a maximally open position. Mud flowing through the flow path in the first configuration experiences a first pressure difference and mud flowing through the flow path in the second configuration experiences a second pressure difference which is less than the first pressure difference. In certain such embodiments, the flow path of the maximally closed position extends through a cross-sectional area perpendicular to the rotation axis, and the cross-sectional area comprises one or more arc portions of an annulus bounded at least in part by the maximum inscribed circle of the central portion and the maximum inscribed circle of the central orifice region (see, e.g., FIG. 3A and FIG. 5A). As shown in FIGS. 3A and 5A, each of these annulus arc portions are elongate in that the radial extent of this cross-sectional area is smaller than the axial extent of this cross-sectional area, such that the cross-sectional area has an aspect ratio that is not minimized (e.g., aspect ratio that does not equal one and is not close to one). For example, rather than approximating a circular area, a square area or an equilateral triangular area, the annulus arc portion more closely approximates a bilaterally symmetric trapezoidal area (e.g., a rectangular area) with a maximum dimension (e.g., a first side length) that is significantly greater than a minimum dimension (e.g., a second side length). Such embodiments thus differ from previously-existing designs which utilized a minimized aspect ratio.

FIGS. 3A-3D schematically illustrate four positions of the rotor assembly 200 when used in the continuously rotating mode in accordance with certain embodiments described herein. As shown in FIGS. 3A-3D, both the rotor assembly 200 and the stator assembly 100 are substantially centered about the rotation axis. In certain embodiments, the central portion of the rotor assembly 200 and the single unitary orifice region of the stator assembly 100 are substantially centered about the rotation axis.

FIG. 3A shows the rotor assembly 200 in the full closed position presenting the smallest area to the mud flow, thereby generating the largest pressure drop. In this position, the minimum flow area is around and in proximity to the central portion 210 (e.g., rotor hub). The diameter of the central portion 210 (e.g., rotor hub) and the inner radius of the elongate portions 110 (e.g., stator fingers) are chosen in certain embodiments to give the desired pressure drop across the valve for a given mud weight, flow rate, and viscosity. Any lost circulation material (LCM) should freely pass through the four openings defined by the elongate portions 220 (e.g., rotor blades) on three sides and the ID of the elongate portions 110 (e.g., fingers) on the fourth side. These four openings together comprise the minimum flow area. While FIG. 3A shows a valve having four lobes and four poles, certain other embodiments can have 2, 3, 4, 5, 6, 7, 8, or more lobes and/or poles.

Figure 3B:
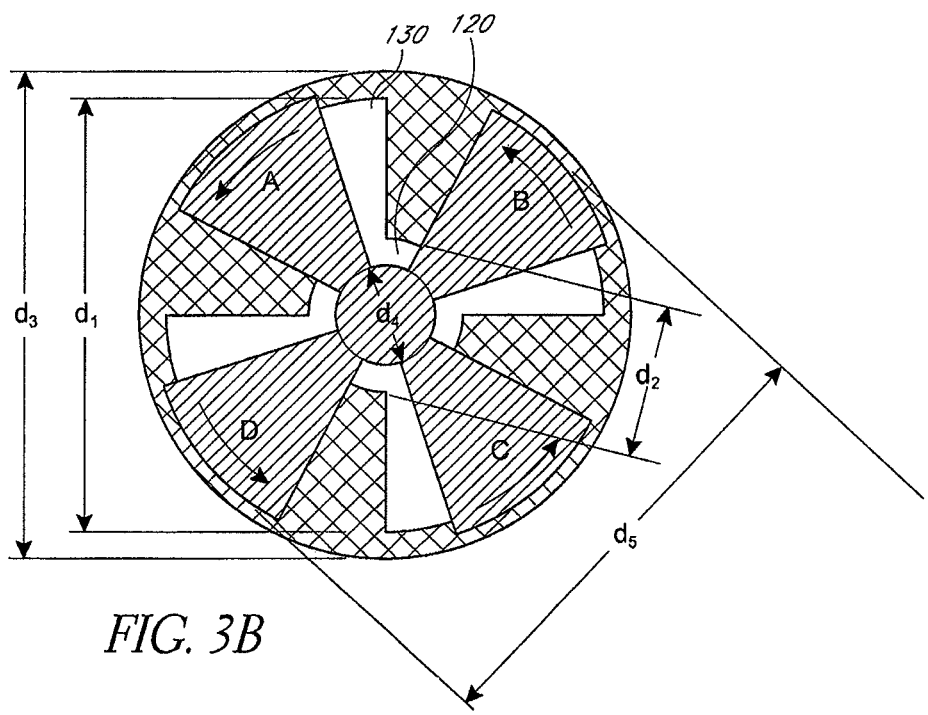
Figure 3C:
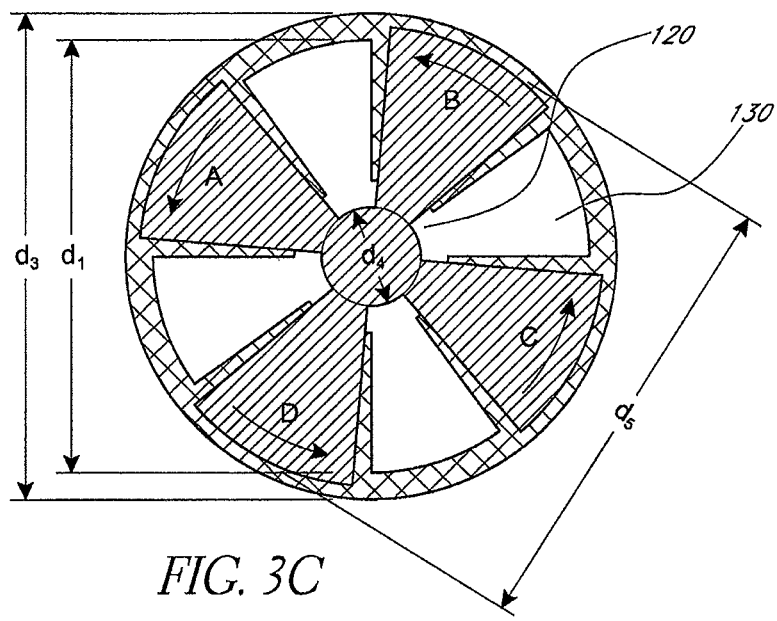
Figure 3D:
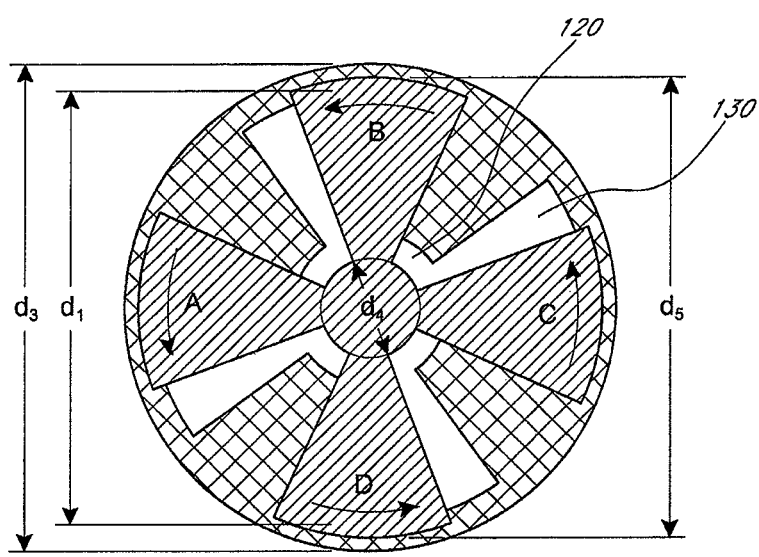

FIG. 3B shows the rotor assembly 200 in the half open position. The area being presented to the mud flow is increasing and the pressure drop across the valve is decreasing. FIG. 3C shows the full open position. The maximum flow area is presented to the mud flow and the pressure drop across the valve is minimal for a given mud weight, flow rate, and viscosity. FIG. 3D shows the valve beginning to close as the rotor assembly 200 continues to rotate past the fully open position.

In contrast to previously-disclosed valves, certain embodiments described herein allow for the minimum flow area to be annularly distributed in close proximity to and centered around the central portion 210 (e.g., rotor hub) and shaft (see, e.g., FIG. 3C). Specifically, the minimum (inner) diameter of the minimum flow area can be equal to the "rotor hub" OD. The maximum diameter of the minimum flow area can be chosen by the minimum radial dimensions of the elongate portions 120 (e.g., stator fingers) that point radially inwards towards the central portion 210 (e.g., rotor hub) but do not come in contact or close proximity with the central portion 210 (e.g., rotor hub). By having the minimum flow area in close proximity to and centered around the central portion 210, certain embodiments described herein advantageously have the minimum flow area, where the mud flow is anticipated to be fastest, located in a region where the components of the valve are sturdiest and most resistant to wear.

In certain embodiments described herein, the valve provides one or more of the following design features:
1. Balanced dwell times between the maximal and minimal valve pressure drop waveforms relative to the time based mean value of the pressure waveform;
2. Minimizing the rotational (shear) forces;
3. Minimizing the erosion of the metallic parts in and immediately downstream from the valve; and,
4. A rotor shape that is "stable open."
5. Reducing the jamming tendency for many types of LCM, namely, medium and large nut plug, cedar bark (with strings), and cellophane strips;

In certain embodiments, the valve is driven by an electric motor with a gear box and magnetic positioner (see, e.g., U.S. Pat. Nos. 5,237,540 and 5,375,098), but there could also be additional rotational torque provided by impeller blades mechanically coupled in some form to the rotor assembly 200 that convert mud flow into rotational forces (see, e.g., U.S. Pat. No. 4,914,637). In certain embodiments, the valve is configured to permit reverse rotation of the rotor assembly 200 relative to the stator assembly 100 so as to provide further anti jamming capability. For example, the valve can enable returning the rotor assembly 200 to the last maximally open position.

The magnetic positioner in certain embodiments is designed to return the rotor assembly 200 to the maximally open position during states of no power, such as occur when making drill pipe connections or pulling out of hole. Certain embodiments described herein do not require batteries to operate the valve, although they could be used in emergency situations to sense that the magnetic positioner has moved the rotor assembly 200 into the open position or to assist the magnetic positioner to move the rotor assembly 200 into the maximally open position. When implementing phase shift keying (PSK) or frequency shift keying (FSK) encoding, the timing of the phase or frequency changes can be timed to take advantage of the cyclical torque that is provided by the magnetic positioner and to use it to accelerate or decelerate the rotor assembly 200 as needed to implement the desired encoding of the data (see, e.g., U.S. Pat. Nos. 5,249,161, 5,237,540, and 5,375,098).

Figure 4A:
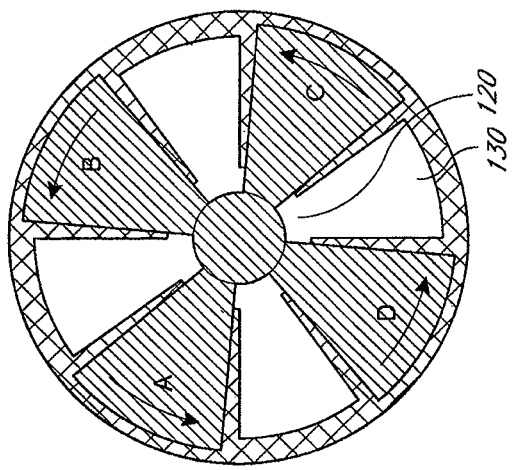
FIGS. 4A-4C schematically illustrate positions of the rotor assembly when used in an oscillatory mode in accordance with certain embodiments described herein.
Figure 4B:
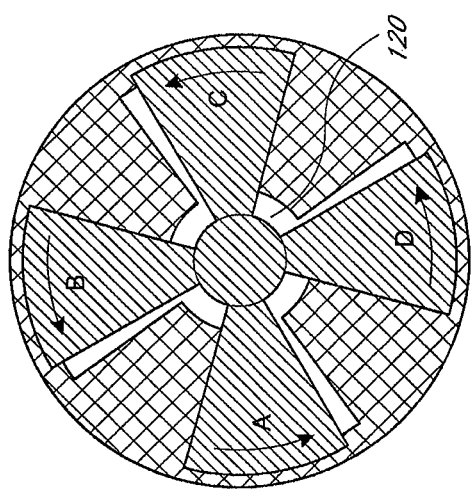
Figure 4C:
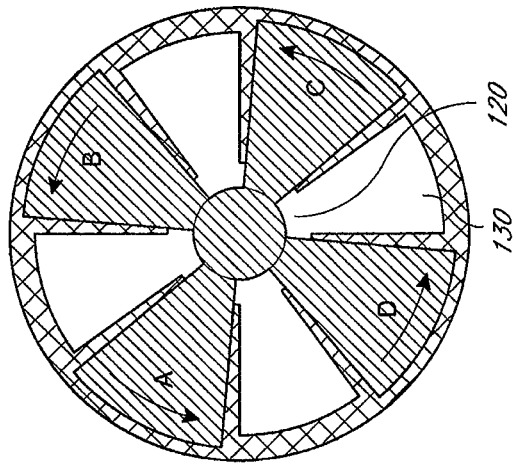

A further embodiment and application of the valve is schematically illustrated in FIGS. 4A-4C where it is used in an oscillatory mode. FIG. 4A shows a four-lobed rotor assembly 200 and stator assembly 100 in the full open position. At some time later, the rotor assembly 200 rotates into the position shown in FIG. 4B, where the elongate portions (e.g., rotor blades) only partially block the elongate orifices 130 of the stator assembly 100. After dwelling at the position shown in FIG. 4B for some predetermined duration of time, the rotor assembly 200 retreats to the position shown in FIG. 4C, which can be identical to that of FIG. 4A. The amount of closure shown in FIG. 4B can be dynamically changed to purposely vary the amplitude of the pressure pulses or a pulse train if used in a carrier-based measurement while drilling system communication system. In the position shown in FIG. 4B, the magnetic positioner can apply a reverse torque that will return the rotor assembly 200 to the positions shown in FIGS. 4A and 4C.

Figure 5B:
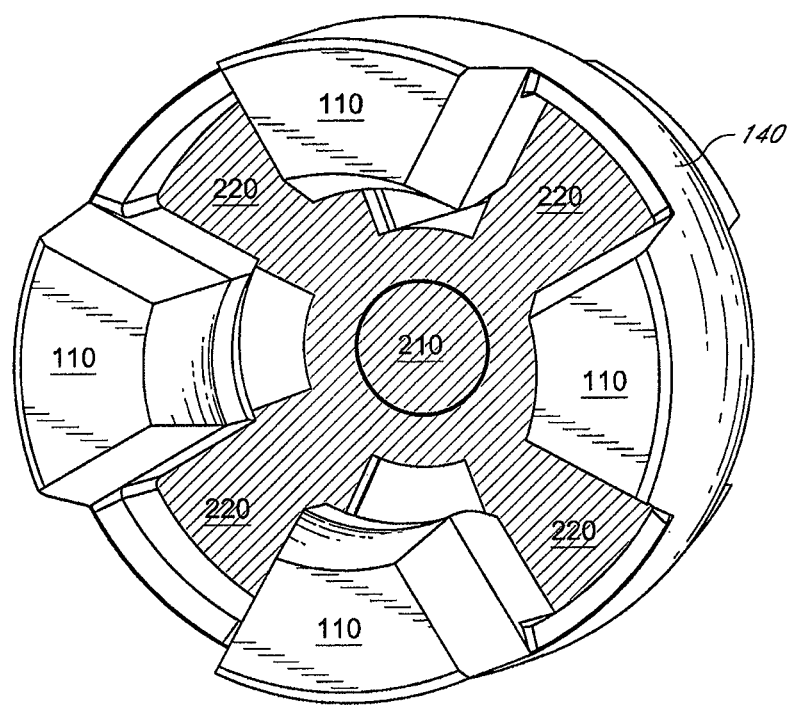
Figure 6A:
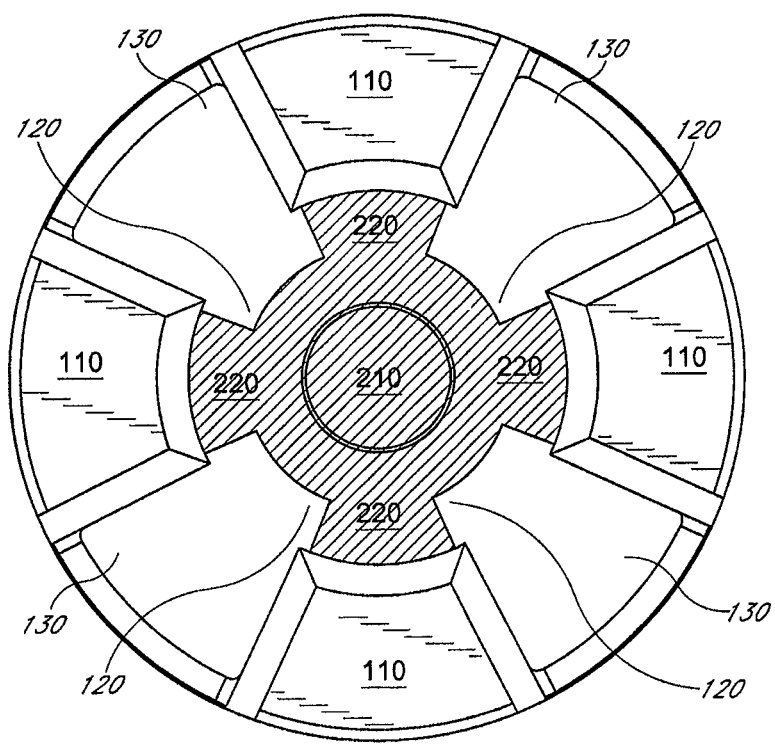
FIGS. 6A and 6B schematically illustrate an on-axis view and an off-axis view, respectively, of an example stator assembly and rotor assembly in the maximally open position in accordance with certain embodiments described herein.
Figure 6B:
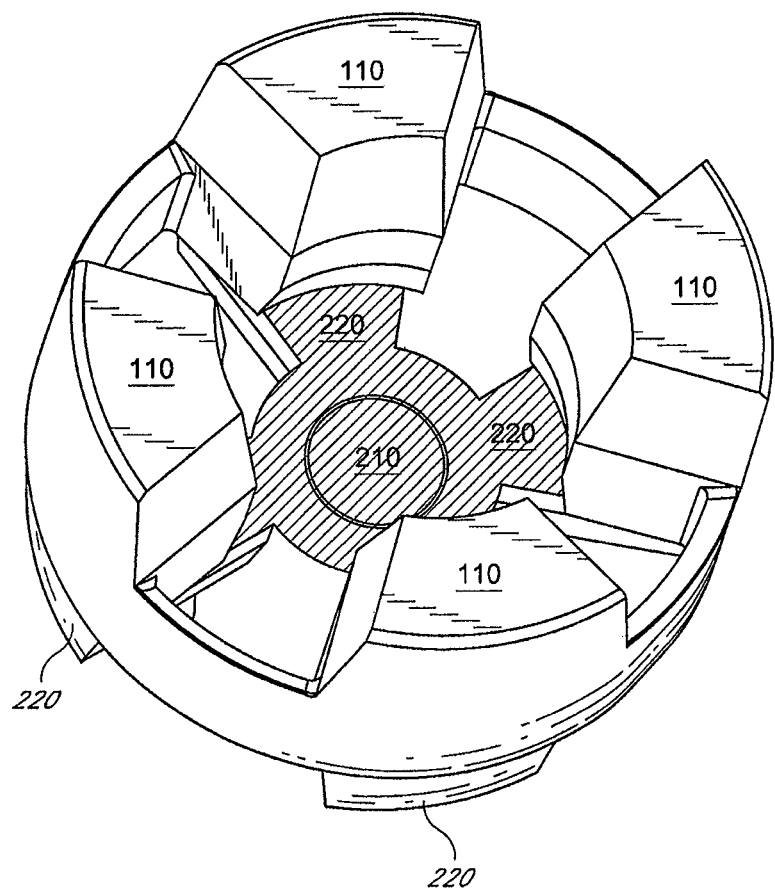

FIGS. 5A and 5B schematically illustrate an on-axis view and an off-axis view, respectively, of the stator assembly 100 and the rotor assembly 200 in the maximally closed position. FIGS. 6A and 6B schematically illustrate an on-axis view and an off-axis view, respectively, of the stator assembly 100 and the rotor assembly 200 in the maximally open position. In certain embodiments, the rotor assembly 200 (e.g., comprising the central portion 210 or hub, blades, and axle extending along the rotation axis) and the stator assembly 100 are both intersected by a cross-section plane that is substantially perpendicular to the rotation axis. For example, the axle extending along the rotation axis extends at least partially through the stator assembly. In certain embodiments, the valve has only a negligible gap between a first surface of the stator assembly 100 substantially perpendicular to the rotation axis and a second surface of the rotor assembly 200 substantially perpendicular to the rotation axis and proximal to the first surface of the stator assembly 100. For example, while the gap between the first surface and the second surface is sufficiently large to permit operational rotation of the rotor assembly 200 relative to the stator assembly 100, the gap is not sufficiently large so as to appreciably contribute to the flow path of mud through the valve in the maximally closed position.

In certain embodiments, having the minimally open area distributed around the central portion 210 (e.g., rotor hub) offers the least amount of resistance to the flow of solid matter past the valve, including but not limited to cellophane strips of different lengths. Designing the stator assembly 100 with one large connected opening in certain embodiments can minimize the probability of draping of the cellophane strips or other string-shaped LCM across the elongate portions 110 (e.g., stator fingers). Further, should a piece of strip-shaped LCM drape across one of the elongate portions 110 (e.g, stator fingers), in certain such embodiments, it will clear itself in a short of amount of time and be flushed through the central area surrounding the central portion 210 (e.g., rotor hub).

In certain embodiments, the portions of the valve in proximity to the rotation axis (e.g., the central portion 210, the rotor hub) are stronger and more resilient to wear than are other portions (e.g., peripheries of the rotor blades). By moving the minimally open area (which is a high erosion and high flow velocity area) to be in proximity to the rotation axis, rather than at the periphery of the elongate portions 220 (e.g., rotor blades) (e.g., moving the minimally open area away from the collar or protective sleeve inner diameters), certain embodiments described herein advantageously provide a design that is more resilient to wear than conventional valves.

In certain embodiments, the rotation of the rotor assembly 200 relative to the stator assembly 100 is nominally in a single direction without any reversal of motion, but the speed can vary from 0 revolutions per minute (RPM) up to some predetermined rotational velocity chosen by design for the encoding of data using either FSK or PSK carrier based modulation protocols.

To implement FSK in its simplest form, namely two frequencies, the rotor assembly 200 in certain embodiments can change its rate of rotation between two predetermined rotation velocities, a high rate and a low rate, by accelerating or decelerating as needed to encode the data. By way of example, the lower of the two said frequencies could represent a logical "0" and the higher of the two said frequencies could represent a logical "1," and vice versa. Certain embodiments can be used to implement minimum shift keying (MSK).

To implement PSK, the rotor assembly 200 can have a primary rate of rotation chosen to generate a particular carrier frequency of mud pulses, and would decelerate to introduce a desired phase delay in the carrier and then accelerate back to the predetermined primary rate of rotation. If only two phases are used, namely 0 degrees and 180 degrees, then the presence of a phase shift detected within a particular time window could represent a logical "1" and the absence of a phase shift during said particular time window could represent a logical "0," and vice versa.

In certain embodiments, the valve can be used in a rotationally oscillating mode (see, e.g., U.S. Pat. No. 6,714,138) whereby the amount of maximum angular displacement, $\Theta$, that the rotor assembly 200 effectuates in any given cycle is controllable. By way of example, for a three-lobe valve, the maximum amount of angular displacement would never exceed approximately 65 degrees. To generate a maximum amplitude waveform, the valve rotates in one direction until it has reached some chosen maximum angular displacement from the maximally open position, dwells in that position for a moment to balance the time durations of the high and low portions of the pressure waveform, and then returns back to the "0 degree" or fully open position. By way of further example, to generate a lower amplitude waveform, the valve rotates until it has reached 77% of the maximum allowed rotation (~50 degrees), dwell for a moment and then returns back to the "0 degree" fully open position. In addition, the rotor assembly 200 can be continuously oscillating between 0 degrees and some variable angle $\Theta_1$ in such a manner as to generate a constant frequency train of pressure pulses in the mud column at a first amplitude, and can then introduce either a phase shift (for PSK encoding) or a frequency shift (for FSK encoding). At some later time, the rotor assembly 200 can oscillate between 0 degrees and a second angle $\Theta_2$ to allow for a constant frequency train of pressure pulses at a second amplitude in conjunction with either FSK or PSK encoding. Alternatively, it could allow for the implementation of amplitude-shift keying (ASK) modulation as an additional solitary data encoding technique.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A valve for communication of a measurement while drilling system, the valve comprising:
    a first structure having a central portion and one or more elongate portions radially extending from the central portion; and
    a second structure having one or more portions which substantially bound a central orifice region and one or more elongate orifice regions radially extending from the central orifice region,
    wherein at least one of the first structure and the second structure is configured to be rotated about a rotation axis to produce a relative rotation between the first structure and the second structure such that a flow path through which mud can flow varies as the at least one of the first structure and the second structure rotates about the rotation axis, the flow path defined at least by the first structure and the second structure,
    wherein the central portion has a maximum inscribed circle encircling the rotation axis and having a first radius and the central orifice region has a maximum inscribed circle encircling the rotation axis and having a second radius greater than the first radius.

2. The valve of claim 1, wherein the maximum inscribed circle of the central portion is inscribed within the central portion without extending past the first structure and has the largest radius of all circles inscribed within the central portion without extending past the first structure.

3. The valve of claim 1, wherein the maximum inscribed circle of the central orifice region is inscribed within the central orifice region without overlapping the second structure and has the largest radius of all circles inscribed within the central orifice region without overlapping the second structure.

4. The valve of claim 1, wherein the central portion and the central orifice region are concentric with one another.

5. The valve of claim 1, wherein the central portion and the central orifice region are substantially centered about the rotation axis.

6. The valve of claim 1, wherein the flow path varies between a first configuration when the first and second structures are in a maximally closed position and a second configuration when the first and second structures are in a maximally open position, wherein mud flowing through the flow path in the first configuration experiences a first pressure difference and mud flowing through the flow path in the second configuration experiences a second pressure difference which is less than the first pressure difference.

7. The valve of claim 6, wherein the flow path when the first and second structures are in the maximally closed position extends through a cross-sectional area perpendicular to the rotation axis, the cross-sectional area comprising one or more arc portions of an annulus bounded at least in part by the maximum inscribed circle of the central portion and the maximum inscribed circle of the central orifice region.

8. The valve of claim 1, wherein the valve is configured to be mounted within a tool body and wherein the first structure comprises a rotor configured to be controllably rotated relative to the tool body about the rotation axis and the second structure comprises a stator configured to not rotate relative to the tool body.

9. The valve of claim 1, wherein the central portion comprises a hub and the one or more elongate portions of the first structure comprises one or more blades extending from the hub, the one or more blades having an outer edge at a first maximum radial distance from the rotation axis.

10. The valve of claim 9, wherein the one or more elongate orifice regions have an outer edge at a second maximum radial distance from the rotation axis, wherein the second maximum radial distance of the one or more elongate orifice regions is smaller than the first maximum radial distance of the one or more blades.

11. The valve of claim 10, wherein the one or more blades block mud from flowing through a maximum portion of the one or more elongate orifice regions when the first and second structures are in a maximally closed position.

12. The valve of claim 11, wherein the blades are substantially identical to one another and are substantially uniformly distributed about the rotation axis.

13. The valve of claim 10, wherein the one or more blades each have a first edge and a second edge both extending substantially radially from the hub and having a first angle between the first edge and the second edge, and the one or more elongate orifice regions of the second structure each have a third edge and a fourth edge both extending substantially radially from the central orifice region and having a second angle between the third edge and the fourth edge, the second angle less than the first angle.

14. The valve of claim 1, wherein, upon a substantially constant angular velocity of the relative rotation between the first structure and the second structure, a time average of a differential pressure across the valve over an integral number of cycles is approximately equal to an arithmetic average of (i) a differential pressure across the valve in a maximally open position and (ii) a differential pressure across the valve in a maximally closed position.

15. The valve of claim 14, wherein the differential pressure as a function of time approximates a square wave function.

16. A valve for communication of a measurement while drilling system, the valve comprising:
  a first structure having a central portion and one or more elongate portions radially extending from the central portion; and
  a second structure having one or more portions which substantially bound a single unitary orifice region comprising a central orifice region and one or more elongate orifice regions radially extending from the central orifice region, wherein the central portion has a maximum inscribed circle encircling a rotation axis and having a first radius and the central orifice region has a maximum inscribed circle encircling the rotation axis and having a second radius greater than the first radius,
  wherein at least one of the first structure and the second structure is configured to be rotated about the rotation axis to produce a relative rotation between the first structure and the second structure such that a flow path through which mud can flow is defined by and bounded at least in part by the first structure and the second structure and varies as the at least one of the first structure and the second structure rotates about the rotation axis, the flow path varying between a first configuration when the first and second structures are in a maximally closed position and a second configuration when the first and second structures are in a maximally open position, wherein mud flowing through the flow path in the first configuration experiences a first pressure difference and mud flowing through the flow path in the second configuration experiences a second pressure difference which is less than the first pressure difference.

17. The valve of claim 16, wherein both the first structure and the second structure are intersected by a cross-sectional plane that is substantially perpendicular to the rotation axis.

18. The valve of claim 17, wherein the central portion is substantially centered about the rotation axis and the single unitary orifice region is substantially centered about the rotation axis.

19. The valve of claim 16, wherein the first structure and the second structure are substantially centered about the rotation axis.

20. The valve of claim 16, wherein the flow path when the first and second structures are in the maximally closed position extends through a cross-sectional area perpendicular to the rotation axis, the cross-sectional area comprising one or more arc portions of an annulus bounded at least in part by the first and second structures.

21. A valve for communication of a measurement while drilling system, the valve comprising:
  a first structure comprising a central portion and one or more elongate portions radially extending from the central portion, the central portion comprising a hub and the one or more elongate portions comprising a plurality of blades radially extending from the hub; and
  a second structure comprising one or more portions which substantially bound a central orifice region and one or more elongate orifice regions radially extending from the central orifice region, the one or more portions comprising an outer ring and a plurality of portions radially extending from the outer ring towards a center region of the second structure, the central portion having a maximum inscribed circle encircling a rotation axis and having a first radius and the central orifice region having a maximum inscribed circle encircling the rotation axis and having a second radius greater than the first radius,
  wherein at least one of the first structure and the second structure is configured to be controllably rotated about the rotation axis to produce a relative rotation between the first structure and the second structure such that the first structure and the second structure define a flow path through which mud can flow and which varies as the at least one of the first structure and the second structure rotates about the rotation axis, the flow path having a flow area projected in a plane substantially perpendicular to the rotation axis and varying between a minimum flow area when the first and second structures are in a maximally closed position and a maximum flow area when the first and second structures are in a maximally open position, the maximum flow area radially extending a maximum first distance between the hub and the outer ring and the minimum flow area radially extending a maximum second distance between the hub and the one or more portions, wherein the maximum second distance is between 10% and 90% of the maximum first distance.

22. The valve of claim 21, wherein the maximum second distance is no greater than 75% of the maximum first distance.

23. The valve of claim 21 wherein the maximum second distance is no greater than 50% of the maximum first distance.

24. The valve of claim 21, wherein the maximum second distance is no greater than 25% of the maximum first distance.

25. The valve of claim 21, wherein each blade of the plurality of blades has a blade length which is larger than the maximum second distance.

26. A method of fabricating a valve for communication of a measurement while drilling system, the method comprising:
providing a first structure having a central portion and one or more elongate portions radially extending from the central portion; and
providing a second structure having one or more elongate portions which substantially bound a central orifice region and one or more elongate orifice regions radially extending from the central orifice region, wherein the central portion has a maximum inscribed circle encircling a rotation axis and having a first radius and the central orifice region has a maximum inscribed circle encircling the rotation axis and having a second radius greater than the first radius, wherein at least one of the first structure and the second structure is configured to be rotated about the rotation axis to produce a relative rotation between the first structure and the second structure such that a flow path through which mud can flow varies as the at least one of the first structure and the second structure rotates about the rotation axis, the flow path varying between a first configuration when the valve is in a maximally closed position and a second configuration when the valve is in a maximally open position, the flow path defined at least by the first structure and the second structure, the valve having a maximum differential pressure across the valve when in the maximally closed position and having a minimum differential pressure across the valve when in the maximally open position;
selecting a first angular width of the one or more elongate portions about the rotation axis and a second angular width of the one or more elongate orifice regions about the rotation axis; and
after selecting the first and second angular widths, selecting a first radial extent of the central portion of the first structure and a second radial extent of the one or more elongate portions of the second structure.

27. The method of claim 26, wherein the first angular width and the second angular width are selected such that a pressure waveform generated by the valve is a balanced waveform, and the first radial extent and the second radial extent are selected independently from selecting the first and second angular widths to adjust a magnitude of the pressure waveform.

28. The method of claim 26, further comprising selecting the first angular width, the second angular width, the first radial extent, and the second radial extent such that a differential pressure across the valve over a time period approximately equal to an integral number of cycles has a balanced waveform.

29. The method of claim 28, wherein a time average of a differential pressure across the valve over an integral number of cycles is approximately equal to an arithmetic average of the maximum differential pressure and the minimum differential pressure.

* * * * *